US012647906B2

(12) United States Patent
Yuan et al.

(10) Patent No.: US 12,647,906 B2
(45) Date of Patent: Jun. 2, 2026

(54) TECHNIQUES FOR MAXIMUM PERMISSIBLE EXPOSURE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/279,782

(22) PCT Filed: May 11, 2021

(86) PCT No.: PCT/CN2021/092981
§ 371 (c)(1),
(2) Date: Aug. 31, 2023

(87) PCT Pub. No.: WO2022/236659
PCT Pub. Date: Nov. 17, 2022

(65) Prior Publication Data
US 2024/0172133 A1 May 23, 2024

(51) Int. Cl.
*H04W 52/36* (2009.01)
*H04B 7/06* (2006.01)
*H04W 52/24* (2009.01)

(52) U.S. Cl.
CPC ........ *H04W 52/365* (2013.01); *H04B 7/0626* (2013.01); *H04W 52/24* (2013.01)

(58) Field of Classification Search
CPC ... H04W 52/365; H04W 52/24; H04W 52/42; H04B 7/0626
See application file for complete search history.

(56) References Cited

U.S. PATENT DOCUMENTS

2020/0112926 A1* 4/2020 Laghate ............... H04B 7/0696
2022/0377799 A1* 11/2022 MolavianJazi ...... H04B 7/0695
2023/0292259 A1* 9/2023 Matsumura ........... H04W 52/18
2023/0387992 A1* 11/2023 Guo ........................ H04B 7/088

FOREIGN PATENT DOCUMENTS

CN         110536397 A    12/2019
WO         2021008710 A1    1/2021
WO    WO-2022123778 A1 *  6/2022  ............ H04W 24/10

OTHER PUBLICATIONS

International Search Report and Written Opinion—PCT/CN2021/092981—ISA/EPO—Feb. 10, 2022.
(Continued)

*Primary Examiner* — Fayyaz Alam
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit an indication of support for one or more of panel-specific reporting or beam-specific reporting of maximum permissible exposure (MPE) parameters. The UE may receive an indication to report the MPE parameters with panel-specific reporting or beam-specific reporting. Numerous other aspects are described.

30 Claims, 8 Drawing Sheets

(56)                  References Cited

OTHER PUBLICATIONS

OPPO: "Enhancements on Multi-Beam Operation", 3GPP TSG RAN WG1 #102-e, R1-2005983, e-meeting, Aug. 17, 2020-Aug. 28, 2020, 5 Pages, Aug. 28, 2020 (Aug. 28, 2020), section 3.
ZTE: "Preliminary Views on Further Enhancement for NR MIMO", 3GPP TSG RAN WG1 Meeting #101-e, R1-2003483, e-Meeting, May 25-Jun. 5, 2020, 19 Pages, Jun. 5, 2020 (Jun. 5, 2020), section 2.2.2, the whole document.

* cited by examiner

400

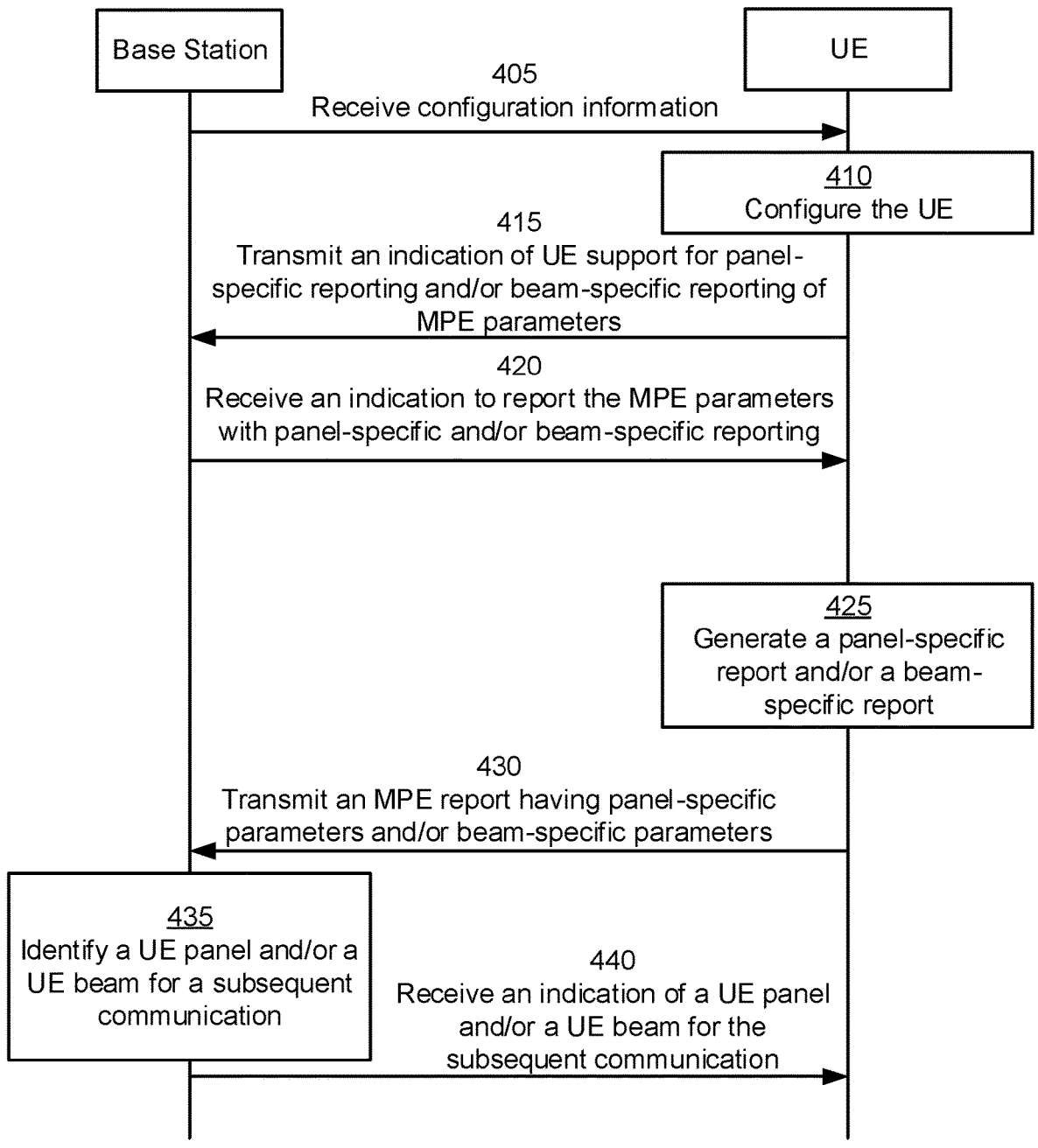

| Base Station | | UE |
| --- | --- | --- |

405
Receive configuration information

410
Configure the UE

415
Transmit an indication of UE support for panel-specific reporting and/or beam-specific reporting of MPE parameters 420
Receive an indication to report the MPE parameters with panel-specific and/or beam-specific reporting 425
Generate a panel-specific report and/or a beam-specific report 430
Transmit an MPE report having panel-specific parameters and/or beam-specific parameters 435
Identify a UE panel and/or a UE beam for a subsequent communication 440
Receive an indication of a UE panel and/or a UE beam for the subsequent communication

FIG. 4

Transmit an indication of support for one or more of panel-specific reporting or beam-specific reporting of MPE parameters

510

Receive an indication to report the MPE parameters with panel-specific reporting or beam-specific reporting

520

500

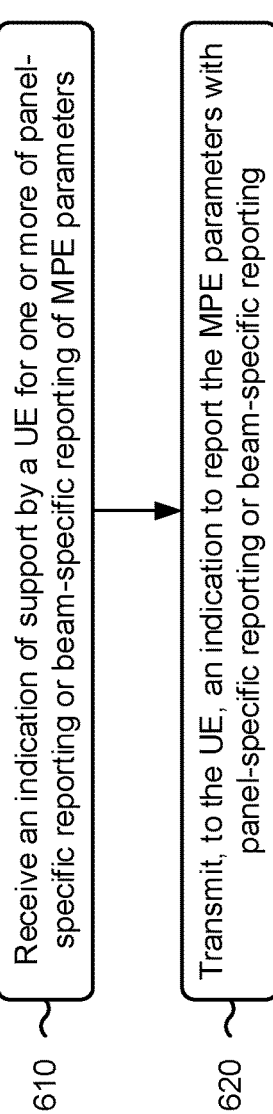
Receive an indication of support by a UE for one or more of panel-specific reporting or beam-specific reporting of MPE parameters
610
Transmit, to the UE, an indication to report the MPE parameters with panel-specific reporting or beam-specific reporting
620
600
FIG. 6

TECHNIQUES FOR MAXIMUM PERMISSIBLE EXPOSURE REPORTING

CROSS-REFERENCE TO RELATED APPLICATION

This application is a 371 national stage of Patent Cooperation Treaty (PCT) Application No. PCT/CN2021/092981 filed on May 11, 2021, entitled "TECHNIQUES FOR MAXIMUM PERMISSIBLE EXPOSURE REPORTING," which is hereby expressly incorporated by reference herein.

FIELD OF THE DISCLOSURE

Aspects of the present disclosure generally relate to wireless communication and to techniques and apparatuses for maximum permissible exposure reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting an indication of support for one or more of panel-specific reporting or beam-specific reporting of maximum permissible exposure (MPE) parameters; and receiving an indication to report the MPE parameters with panel-specific reporting or beam-specific reporting.

In some aspects, the method includes transmitting an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the method includes generating a panel-specific report based at least in part on beam-specific values.

In some aspects, generation of the panel-specific report based at least in part on the beam-specific values comprises: generating the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the method includes transmitting an indication of support for the UE to transmit a channel state information (CSI) report that includes CSI for an uplink channel.

In some aspects, the indication of support for the UE to transmit a CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, a method of wireless communication performed by a base station includes receiving an indication of support by a UE for one or more of panel-specific reporting or beam-specific reporting of MPE parameters; and transmitting, to the UE, an indication to report the MPE parameters with panel-specific reporting or beam-specific reporting.

In some aspects, the method includes receiving an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the method includes transmitting an indication of a configuration for generating a panel-specific report based at least in part on beam-specific values.

In some aspects, the configuration for generating the panel-specific report based at least in part on the beam-specific values comprises: a configuration to generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the method includes receiving an indication of support for the UE to transmit a CSI report that includes CSI for an uplink channel.

In some aspects, the indication of support for the UE to transmit the CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, a UE for wireless communication includes a memory; and one or more processors, coupled to the memory, configured to: transmit an indication of support for one or more of panel-specific reporting or beam-specific reporting of MPE parameters; and receive an indication to report the MPE parameters with panel-specific reporting or beam-specific reporting.

In some aspects, the one or more processors are further configured to: transmit an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the one or more processors are further configured to: generate a panel-specific report based at least in part on beam-specific values.

In some aspects, generation of the panel-specific report based at least in part on the beam-specific values comprises: generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the one or more processors are further configured to: transmit an indication of support for the UE to transmit a CSI report that includes CSI for an uplink channel.

In some aspects, the indication of support for the UE to transmit a CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, a base station for wireless communication includes a memory; and one or more processors, coupled to the memory, configured to: receive an indication of support by a UE for one or more of panel-specific reporting or beam-specific reporting of MPE parameters; and transmit, to the UE, an indication to report the MPE parameters with panel-specific reporting or beam-specific reporting.

In some aspects, the one or more processors are further configured to: receive an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the one or more processors are further configured to: transmit an indication of a configuration for generating a panel-specific report based at least in part on beam-specific values.

In some aspects, the configuration for generating the panel-specific report based at least in part on the beam-specific values comprises: a configuration to generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the one or more processors are further configured to: receive an indication of support for the UE to transmit a CSI report that includes CSI for an uplink channel.

In some aspects, the indication of support for the UE to transmit the CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, a non-transitory computer-readable medium storing a set of instructions for wireless communication includes one or more instructions that, when executed by one or more processors of a UE, cause the UE to: transmit an indication of support for one or more of panel-specific reporting or beam-specific reporting of MPE parameters; and receive an indication to report the MPE parameters with panel-specific reporting or beam-specific reporting.

In some aspects, the one or more instructions further cause the UE to: transmit an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the one or more instructions further cause the UE to: generate a panel-specific report based at least in part on beam-specific values.

In some aspects, the one or more instructions further cause the UE to: generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the one or more instructions further cause the UE to: transmit an indication of support for the UE to transmit a CSI report that includes CSI for an uplink channel.

In some aspects, the indication of support for the UE to transmit a CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, a non-transitory computer-readable medium storing a set of instructions for wireless communication includes one or more instructions that, when executed by one or more processors of a base station, cause the base station to: receive an indication of support by a UE for one or more of panel-specific reporting or beam-specific reporting of MPE parameters; and transmit, to the UE, an indication to report the MPE parameters with panel-specific reporting or beam-specific reporting.

In some aspects, the one or more instructions further cause the base station to: receive an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the one or more instructions further cause the base station to: transmit an indication of a configuration for generating a panel-specific report based at least in part on beam-specific values.

In some aspects, the configuration for generating the panel-specific report based at least in part on the beam-specific values comprises: a configuration to generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the one or more instructions further cause the base station to: receive an indication of support for the UE to transmit a CSI report that includes CSI for an uplink channel.

In some aspects, the indication of support for the UE to transmit the CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

In some aspects, an apparatus for wireless communication includes means for transmitting an indication of support for one or more of panel-specific reporting or beam-specific reporting of MPE parameters; and means for receiving an indication to report the MPE parameters with panel-specific reporting or beam-specific reporting.

In some aspects, the apparatus includes means for transmitting an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the apparatus includes means for generating a panel-specific report based at least in part on beam-specific values.

In some aspects, the apparatus includes means for generating the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the apparatus includes means for transmitting an indication of support for the apparatus to transmit a CSI report that includes CSI for an uplink channel.

In some aspects, the indication of support for the apparatus to transmit a CSI report that includes CSI for the uplink channel indicates support for the apparatus to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the apparatus, available communication resources of the apparatus, or MPE sensing components of the apparatus.

In some aspects, an apparatus for wireless communication includes means for receiving an indication of support by a UE for one or more of panel-specific reporting or beam-specific reporting of MPE parameters; and means for transmitting, to the UE, an indication to report the MPE parameters with panel-specific reporting or beam-specific reporting.

In some aspects, the apparatus includes means for receiving an MPE report having panel-specific parameters or beam-specific parameters.

In some aspects, the MPE parameters comprise one or more of: a power-management-based maximum power reduction value, a power headroom value, a virtual power headroom value, or a modified power headroom value.

In some aspects, the apparatus includes means for transmitting an indication of a configuration for generating a panel-specific report based at least in part on beam-specific values.

In some aspects, the configuration for generating the panel-specific report based at least in part on the beam-specific values comprises: a configuration to generate the panel-specific report based at least in part on a minimum beam-specific value, a maximum beam-specific value, or an average of the beam-specific values.

In some aspects, the indication of support for one or more of panel-specific reporting or beam-specific reporting of MPE parameters comprises an indication of support for layer 1 reporting of one or more of panel-specific reporting or beam-specific reporting of MPE parameters.

In some aspects, the layer 1 reporting comprises one or more of: a reference signal received power report, or a signal-to-interference-plus-noise report.

In some aspects, the apparatus includes means for receiving an indication of support for the UE to transmit a CSI report that includes CSI for an uplink channel.

In some aspects, the indication of support for the UE to transmit the CSI report that includes CSI for the uplink channel indicates support for the UE to transmit the CSI for the uplink channel via one or more of: a same report that includes CSI for a downlink channel, or a separate report from a report that includes CSI for the downlink channel.

In some aspects, the support for the one or more of panel-specific reporting or beam-specific reporting is based at least in part on one or more of: available computing resources of the UE, available communication resources of the UE, or MPE sensing components of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with techniques for maximum permissible exposure reporting, in accordance with the present disclosure.

FIGS. 5-6 are diagrams illustrating example processes associated with techniques for maximum permissible exposure reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
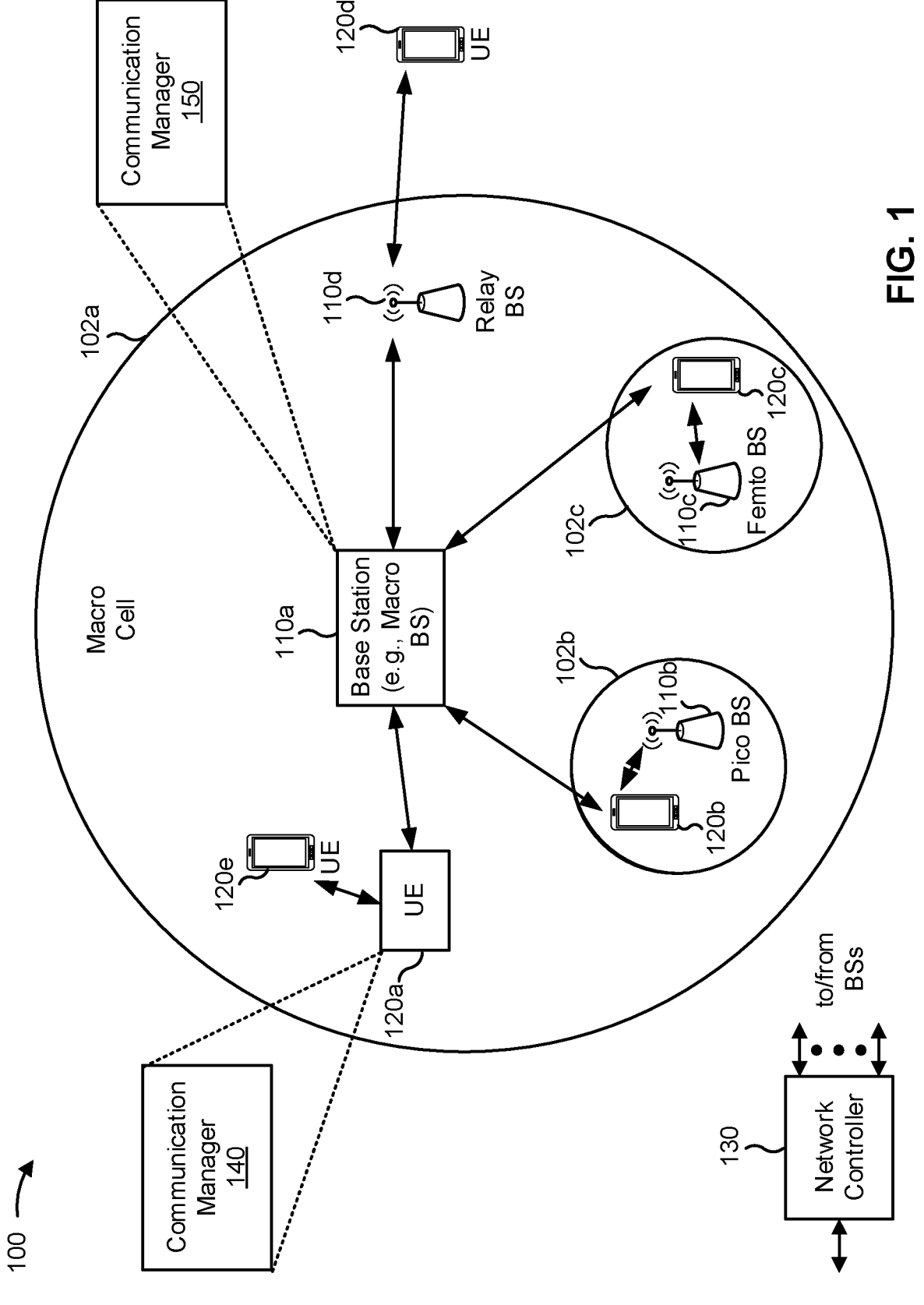
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit an indication of support for one or more of panel-specific reporting or beam-specific reporting of maximum permissible exposure (MPE) parameters; and receive an indication to report the MPE parameters with panel-specific reporting or beam-specific reporting. Additionally, or alternatively, the communication manager 140 may perform one or more other operations described herein.

In some aspects, the base station 110 may include a communication manager 150. As described in more detail elsewhere herein, the communication manager 150 may receive an indication of support by a UE for one or more of panel-specific reporting or beam-specific reporting of MPE parameters; and transmit, to the UE, an indication to report the MPE parameters with panel-specific reporting or beam-specific reporting. Additionally, or alternatively, the communication manager 150 may perform one or more other operations described herein.

As indicated above, FIG. 1 is provided as an example. Other examples may differ from what is described with regard to FIG. 1.

Figure 2:
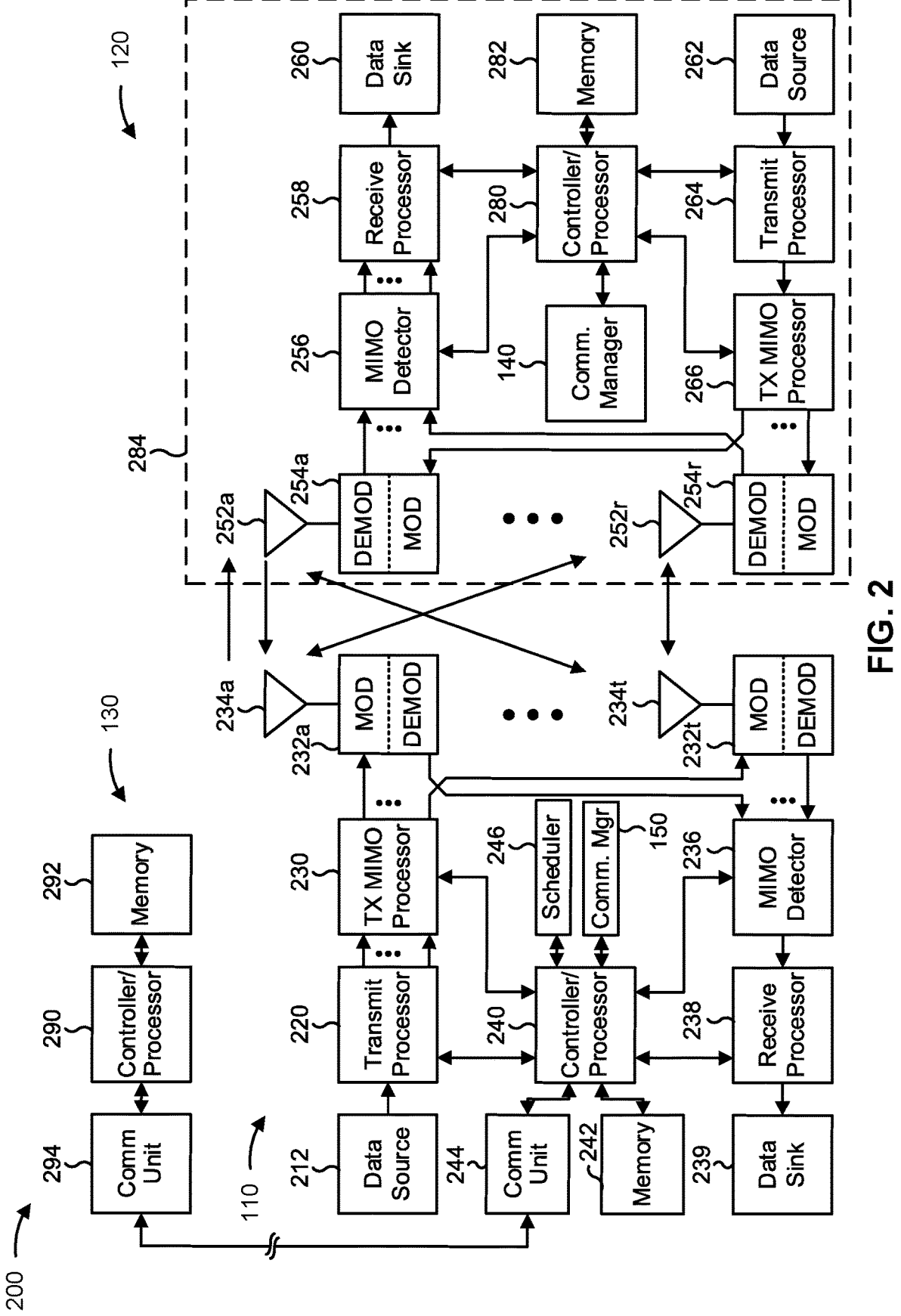
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels (also referenced as "panels"), antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with maximum permissible exposure reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions.

In some aspects, the UE includes means for transmitting an indication of support for one or more of panel-specific reporting or beam-specific reporting of MPE parameters; and/or means for receiving an indication to report the MPE parameters with panel-specific reporting or beam-specific reporting. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for receiving an indication of support by a UE for one or more of panel-specific reporting or beam-specific reporting of MPE parameters; and/or means for transmitting, to the UE, an indication to report the MPE parameters with panel-specific reporting or beam-specific reporting. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example Other examples may differ from what is described with regard to FIG. 2.

Figure 3:
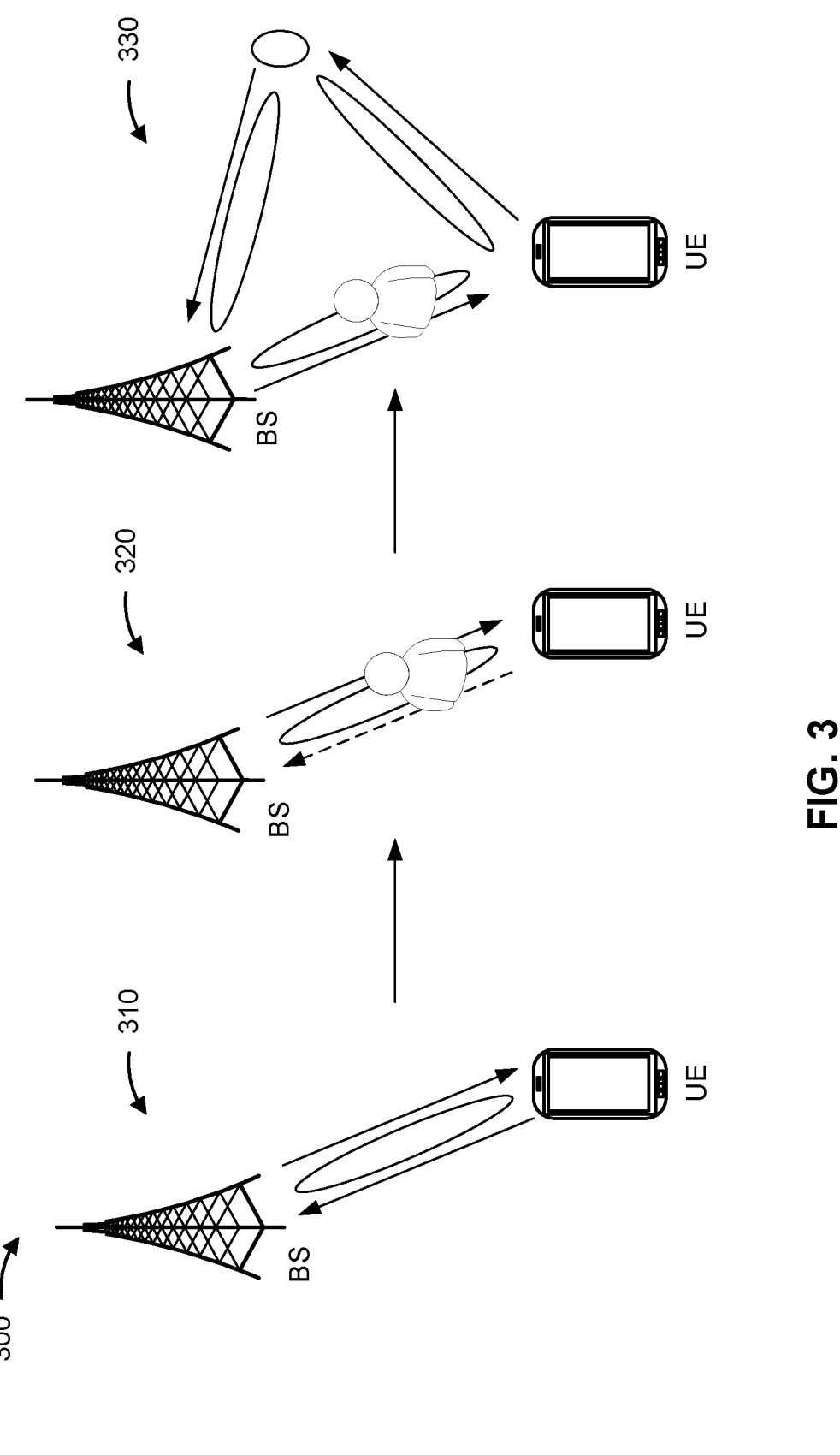
FIG. 3 is a diagram illustrating an example of identifying a maximum permissible exposure (MPE) event associated with a beam, in accordance with the present disclosure.

FIG. 3 is a diagram illustrating an example 300 of identifying an MPE event associated with a beam, in accordance with the present disclosure.

As shown in FIG. 3, and by reference number 310, a UE and a base station may communicate using directional beams. In some wireless networks, a UE may communicate with a base station using directional beamforming to boost transmission power in one or more particular directions associated with one or more beams. By concentrating transmission power in one or more beams, an output energy associated with transmitting communications using the one or beams may be higher than if the UE performed an omni-directional transmission of the communications. This may increase a range for transmitting the communications, but may also cause an energy density of the communications to satisfy (e.g., exceed) an MPE value that defines a highest energy density that is allowed to be exposed to a human body, or other organic material, at close range. An MPE value may be defined via radio resource control (RRC) configurations, for example, to comply with a standard and/or a regulation. The standard and/or regulation may have different limits for different frequency bandwidths. For example, a limit (e.g., corresponding to the MPE value) may be lower for millimeter wave (mmWave) communications than for sub-6 wave communications.

As shown by reference number 320, the UE may identify an MPE event. The UE may identify the MPE event based at least in part on detecting a part of a human body and/or other organic material at close range (e.g., within a threshold range) of the UE and within a path of an uplink beam. Based at least in part on detecting a part of a human body and/or other organic material in a direction of a beam for which transmissions would use an energy density that satisfies the MPE, the UE may reduce transmission power of one or more antennas (e.g., included in an antenna group and/or an antenna panel) that are associated with the beam. However, by reducing transmission power of the one or more antennas that are associated with the beam, the transmission may have insufficient power for the base station to receive the transmission. This may cause a beam failure.

As shown by reference number 330, the UE may resume communicating with the base station using a new beam for uplink communications. The new beam may be in a different direction from the beam associated with the MPE event.

As indicated above, FIG. 3 is provided as an example. Other examples may differ from what is described with regard to FIG. 3.

In some networks, a UE may transmit an indication of an MPE event using a power headroom report (PHR). The UE may transmit the PHR via one or more medium access control (MAC) control elements (MAC CEs). The PHR may include a field (e.g., P field) for indicating whether a backoff (e.g., a power backoff) is less than a minimum power-management-based maximum power reduction (P-MPR) value (e.g., a P_MPR_0), if MPE reporting (e.g., MPE-Reporting) is configured for the PHR. For example, if MPE reporting is configured for the PHR, a value of 0 may indicate that the backoff is less than the minimum P-MPR value. If MPE reporting is not configured for the PHR, the field may indicate (e.g., with a value of 1) that a corresponding a power management maximum power reduction for a carrier f of a serving cell ($P_{CMAX,f,c}$) would have had a different value than a reported value if no power backoff had been applied based at least in part on power management. The PHR may also include a reserved bit (e.g., set to 0 for the PHR indicating the MPE event).

The PHR may also include a power headroom field (e.g., PH field) that indicates a power headroom for an uplink communication associated with the PHR. The PHR may further include an MPE field (e.g., MPE field) that may be used to indicate a UE-specific and/or a cell-specific (e.g., a cell to which the UE is connected) MPE event. If MPE reporting is configured and the P field has a value that indicates that the backoff is not less than a minimum P-MPR value, the MPE field may indicate an applied power backoff used to satisfy MPE requirements. The MPE field may indicate an index of corresponding measured values of P-MPR levels (e.g., in decibels). If MPE reporting is not configured, the MPE field may present reserved bits instead of the MPE event.

Based at least in part on the UE reporting an MPE event (e.g., using the PHR), the base station may be aware that the UE is unable to transmit communications using a current beam and/or that the UE will reduce transmit power using the current beam. However, the PHR may indicate only that an MPE event has occurred, which may not include sufficient information for the base station to efficiently determine a solution for the MPE event. For example, the base station may initiate a beam management process to select new beams for subsequent communications. This may consume power, communication, network, and computing resources and/or may increase latency of communications between the base station and the UE.

In some aspects described herein, a UE may transmit an indication of a UE capability to report beam-specific MPE parameters and/or or panel-specific parameters (e.g., parameters associated with an antenna group that may be located within an antenna panel, within a portion of an antenna panel, or within multiple antenna panels). In this way, a base station may efficiently determine a solution for an MPE event that includes identifying a beam and/or an antenna group associated with the MPE event and/or identifying one or more beams and/or antenna groups that are not associated with the MPE event (e.g., where a power backoff is less than a minimum P-MPR value). This may conserve power, communication, network, and computing resources that may have otherwise been consumed based at least in part on using additional communication to determine the solution for the MPE event and/or may decrease latency of communications between a base station and the UE.

In some aspects, the UE may indicate support for only panel-specific reporting (e.g., panel-specific and not beam-specific), only beam-specific reporting (e.g., beam-specific and not panel-specific), and/or both beam-specific and panel specific reporting. The base station may transmit an indication for the UE to transmit the MPE reporting with a panel-specific report (e.g., based at least in part on the UE indicating support for panel-specific reporting) or with a beam-specific report (e.g., based at least in part on the UE indicating support for beam-specific reporting). In some aspects, the panel-specific reporting or beam-specific reporting may be reported via MAC-layer signaling (e.g., one or more MAC-CEs).

In some aspects, the UE may indicate support for only panel-specific layer 1 reporting (e.g., panel-specific and not beam-specific), only beam-specific layer 1 reporting (e.g., beam-specific and not panel-specific), and/or both beam-specific and panel specific layer 1 reporting. The layer 1 reporting may include a layer 1 RSRP report and/or a layer 1 signal-to-interference-plus-noise-ratio (SINR) report. The base station may transmit an indication for the UE to transmit the MPE reporting with a panel-specific layer 1 report (e.g., based at least in part on the UE indicating support for panel-specific reporting) or with a beam-specific layer 1 report (e.g., based at least in part on the UE indicating support for beam-specific reporting). In some aspects, the panel-specific layer 1 reporting or beam-specific layer 1 reporting may be reported in uplink control signaling, such as a CSI report transmitted via a physical uplink control channel (PUCCH) or a physical uplink shared channel (PUSCH).

In some aspects, the UE may indicate support for beam-specific reporting and the base station may configure the UE to provide a panel-specific report. To generate the panel-specific report, the UE may combine multiple beam-specific MPE parameters (e.g., MPE values) of beams formed using an antenna group associated with the panel-specific report. For example, the UE may report, within the panel-specific report, lowest values of the beam-specific MPE parameters (e.g., a lowest value of the MPE parameters of all beams formed using the antenna group), highest values of the beam-specific MPE parameters, or average values of the beam-specific MPE parameters. For panel-specific reporting, the UE may report at least one panel-specific MPE parameter and a panel ID associated with the reported at least one panel-specific MPE parameter. For beam-specific reporting, the UE may report at least one beam-specific MPE parameter and a beam ID associated with each reported MPE parameter. The panel ID may be reused from an ID of a sounding reference signal (SRS) resource set, an ID of control resource set (CORESET) pool index, an ID of closed loop index used in power control, or any other ID. The beam ID may be an ID of an SRS resource, a CSI-RS resource, or an SSB resource.

In some aspects, the UE may transmit an indication of support for an uplink only CSI report, a downlink only CSI report, or for a single CSI report that includes both uplink CSI and downlink CSI. For example, the UE may support transmitting a synchronization signal block (SSB) resource index (SSBRI) or a CSI resource index (CSI-RI) for different beams (e.g., an uplink beam and a downlink beam) and a metric associated with the different beams (e.g., an RSRP metric or an SINR metric).

FIG. 4 is a diagram illustrating an example 400 associated with techniques for maximum permissible exposure reporting, in accordance with the present disclosure. As shown in FIG. 4, a base station (e.g., base station 110) may communicate with a UE (e.g., UE 120). In some aspects, the base station and the UE may be part of a wireless network (e.g., wireless network 100). As shown in FIG. 4, the UE may transmit an MPE report that includes panel-specific and/or beam specific parameters.

As shown by reference number 405, the base station may transmit, and the UE may receive, configuration information. In some aspects, the UE may receive the configuration information via one or more of RRC signaling, MAC-CEs, and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of UE support for panel-specific and/or beam-specific reporting of MPE parameters. In some aspects, the configuration information may indicate that the UE is to receive an indication to report the MPE parameters with panel-specific and/or beam-specific reporting. In some aspects, the configuration information may indicate that the UE is to generate and transmit a panel-specific report and/or a beam specific report to indicate the MPE parameters based at least in part on detecting an MPR event.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of UE support for panel-specific reporting and/or beam-specific reporting of MPE parameters. In some aspects, the UE may transmit the indication of UE support as part of an RRC configuration process. In some aspects, the UE may transmit the indication of UE support within one or more MAC CEs and/or within a PUCCH communication. For example, the UE may transmit the indication of UE support based at least in part on the UE detecting an MPE event or detecting one or more parameters that indicate that an MPE event is likely to occur (e.g., a backoff that is within a threshold power of a minimum P-MPR value).

In some aspects, the indication of support for panel-specific reporting and/or beam-specific reporting of MPE parameters includes an indication of support for layer 1 reporting of one or more of panel-specific reporting or beam-specific reporting of MPE parameters. The layer 1 reporting may include an RSRP report (e.g., a reported value) or an SINR report (e.g., a reported value). In some examples, the layer 1 reporting may be determined based at least in part on a downlink channel pathloss, an uplink power headroom, a maximum transmit power, and/or a P-MPR. For panel-specific layer 1 reporting, the UE may report at least one panel-specific MPE parameter and a panel ID associated with the reported at least one panel-specific MPE parameter. For beam-specific layer 1 reporting, the UE may report at least one beam-specific MPE parameter and a beam ID associated with each reported at least one beam-specific MPE parameter. The panel ID may be reused from an ID of SRS resource set, an ID of CORESET pool index, an ID of close loop index used in power control, and/or any other ID. The beam ID may be an ID of SRS resource, CSI-RS resource, or SSB resource.

In some aspects, the UE support for the one or more of panel-specific reporting or beam-specific reporting is based at least in part on available computing resources of the UE, available communication resources of the UE, and/or MPE sensing components of the UE. For example, the UE may support panel-specific reporting based at least in part on having MPE sensing components that are configured to detect an MPE event within a wide angle from the UE and/or may support beam-specific reporting based at least in part on having MPE sensing components that are configured to detect an MPE event within a narrow angle from the UE (e.g., an angle with a width that is approximately a same width of a beam).

In some aspects, the MPE parameters include a P-MPR value, a power headroom value, a virtual power headroom value, and/or a modified power headroom value. In some examples, the modified power headroom value may be determined based at least in part on a downlink channel pathloss, an uplink power headroom, a maximum transmit power, and/or a P-MPR, among other examples.

In some aspects, the UE may transmit an indication of support for the UE to transmit a CSI report that includes CSI for an uplink channel and/or a downlink channel. For example, the UE may transmit an indication of support for the UE to transmit the CSI for the uplink channel via a same report that includes CSI for a downlink channel, or a separate report from a report that includes CSI for the downlink channel. In some aspects, the UE may transmit, in a same communication or in a separate communication as the indication of UE support for the one or more of panel-specific reporting or beam-specific reporting, the indication of support for the UE to transmit the CSI report that includes the CSI for the uplink channel within a same report as CSI for the downlink channel or in a separate report from the CSI for the downlink channel.

As shown by reference number 420, the UE may receive, and the base station may transmit, an indication to report the MPE parameters with panel-specific and/or beam-specific reporting. In some aspects, the base station may transmit the indication to report the MPE parameters with beam-specific reporting only if the UE has indicated support for beam-specific reporting. In some aspects, the base station may transmit the indication to report the MPE parameters with panel-specific reporting only if the UE has indicated support for panel-specific reporting. Alternatively, the base station may transmit the indication to report the MPE parameters with panel-specific reporting even if the UE has indicated support for only beam-specific reporting. The base station may configure the UE to generate a panel-specific report based at least in part on beam-specific parameters using one or more configured processes. For example, the base station may configure the UE to generate the panel-specific report based at least in part on minimum parameters of beams formed using an antenna group associated with the panel-specific report, based at least in part on maximum parameters of beams formed using the antenna group associated with the panel-specific report, or based at least in part on average parameters of beams formed using the antenna group associated with the panel-specific report.

As shown by reference number 425, the UE may generate a panel-specific and/or a beam-specific report that indicates MPE parameters. The UE may initiate generation of the panel-specific and/or the beam-specific report based at least in part on detecting an MPE event. In some aspects, the UE may generate the panel-specific and/or the beam-specific report to indicate MPE parameters such as a P-MPR, a virtual PHR and/or a modified version of the PHR (e.g., modified from the PHR described above). The modified version of the PHR may be associated with one or more activated uplink transmission configuration indication (TCI) states and/or spatial relations, one or more joint TCI states, one or more SSBRIs, one or more CSIs, and/or one or more panel identifications from a candidate pool, if reported to the base station. The UE may calculate the MPE parameters at a panel level for a panel-specific report or at a beam level for a beam-specific report.

In some aspects, the UE may generate a panel-specific report based at least in part on beam-specific values. The UE may generate the panel-specific report based at least in part on a minimum beam-specific value, a maximum beam-specific value, or an average of the beam-specific values. In some aspects, the average of the beam-specific values may include a weighted average of the beam-specific values. For example, the weighted average may be calculated using a weighted power mean, where:

$$\text{Weighted power mean: } (w_1 MPE_1^p + w_2 MPE_2^p)^{\frac{1}{p}} \text{ where } w_1 + w_2 = 1$$
$$\text{and } p = \{-\infty, \ldots, 1, 0, 1 \ldots \infty\}$$

Values of p may be determined as:

$$p = -\infty \rightarrow \min(MPE1, MPE2)$$
$$p = -1 \rightarrow \text{harmonic mean}$$
$$p = 0 \rightarrow \text{geometric mean} = sqrt(MPE_1^{w_1} \times MPE_2^{w_2})$$
$$p = 1 \rightarrow \text{arithmetic mean}$$
$$p = \infty \rightarrow \max(MPE1, MPE2)$$

For uplink a panel specific uplink layer 1 report, the UE may indicate support for only panel-specific layer 1 RSRP and/or layer 1 SINR reporting, support for only beam-specific layer 1 RSRP and/or layer 1 SINR reporting and not for panel-specific layer 1-RSRP and/or layer 1 SINR reporting, or support for both beam-specific and panel specific layer 1 RSRP and/or layer 1 SINR reporting. The base station may transmit an indication to report the layer 1 RSRP and/or layer 1 SINR via a panel-specific layer 1 RSRP and/or layer 1 SINR report or via a beam-specific layer 1 RSRP and/or layer 1 SINR report.

Similar to the MPE event reporting described herein, the UE may generate a panel-specific report based at least in part on beam-specific uplink metrics. The UE may generate the panel-specific report based at least in part on a minimum of beam-specific uplink metrics, a maximum of beam-specific uplink metrics, or an average of the beam-specific uplink metrics. In some aspects, the average of the beam-specific uplink metrics may include a weighted average of the beam-specific uplink metrics. For example, the weighted average may be calculated using a weighted power mean, where:

$$\text{Weighted power mean} = (w_1 UL_1^p + w_2 UL_2^p)^{\frac{1}{p}} \text{ where } w_1 + w_2 = 1$$
$$\text{and } p = \{-\infty, \ldots, 1, 0, 1 \ldots \infty\}$$

Values of p may be determined as:

$$p = -\infty \rightarrow \min(UL1, UL2)$$
$$= -1 \rightarrow \text{harmonic mean}$$
$$p = 0 \rightarrow \text{geometric mean} = sqrt(UL_1^{w_1} \times UL_2^{w_2})$$
$$p = 1 \rightarrow \text{arithmetic mean}$$
$$p = \infty \rightarrow \max(UL1, UL2)$$

As shown by reference number 430, the UE may transmit, and the base station may receive, an MPE report having panel-specific parameters and/or beam-specific parameters. In some aspects, the UE may receive one or more other panel-specific parameters and/or beam-specific parameters, such as uplink metrics and/or CSI, among other examples.

As shown by reference number 435, the base station may identify a UE panel and/or a UE beam for a subsequent communication. In some aspects, based at least in part on the UE reporting the MPE report including beam-specific parameters and/or panel-specific parameters, the base station may identify a candidate UE beam (e.g., as an uplink TCI state or a spatial relation) and/or and antenna group (e.g., as a panel identifier) for the UE to use for the subsequent communication. For example, the base station may indicate to the UE to use a beam and/or an antenna group that is not associated with (e.g., blocked by) the MPE event.

As shown by reference number 440, the UE may receive, and the base station may transmit, an indication of a UE panel and/or a UE beam for the subsequent communication. In some aspects, the indication of the UE panel and/or the UE beam may include an indication of a panel identifier, an uplink TCI state, and/or a spatial relation that indicates a UE antenna group and/or UE beam to configure for the subsequent communication.

Based at least in part on the UE transmitting the indication of the UE capability to report beam-specific MPE parameters and/or or panel-specific parameters, and the UE transmitting a beam-specific report or a panel-specific report, a base station may efficiently determine a solution for an MPE event. For example, the base station may identify a beam and/or an antenna group associated with the MPE event and/or identify one or more beams and/or antenna groups that are not associated with the MPE event (e.g., where a power backoff is less than a minimum P-MPR value). This may conserve power, communication, network, and computing resources that may have otherwise been consumed based at least in part on using additional communication to determine the solution for the MPE event and/or may decrease latency of communications between the base station and the UE.

Figure 5:
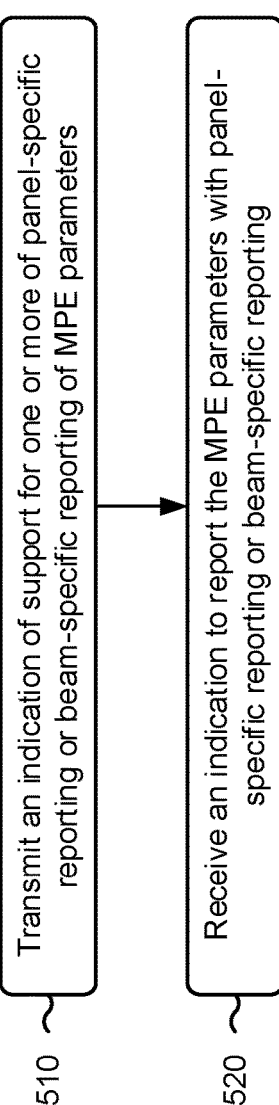

FIG. 5 is a diagram illustrating an example process 500 performed, for example, by a UE, in accordance with the present disclosure. Example process 500 is an example where the UE (e.g., UE 120) performs operations associated with techniques for MPE reporting.

As shown in FIG. 5, in some aspects, process 500 may include transmitting an indication of support for one or more of panel-specific reporting or beam-specific reporting of MPE parameters (block 510). For example, the UE (e.g., using communication manager 140 and/or transmission component 704, depicted in FIG. 7) may transmit an indication of support for one or more of panel-specific reporting or beam-specific reporting of MPE parameters, as described above.

As further shown in FIG. 5, in some aspects, process 500 may include receiving an indication to report the MPE parameters with panel-specific reporting or beam-specific reporting (block 520). For example, the UE (e.g., using communication manager 140 and/or reception component 702, depicted in FIG. 7) may receive an indication to report the MPE parameters with panel-specific reporting or beam-specific reporting, as described above.

Process 500 may include additional aspects, such as any single aspect or any combination of aspects described below and/or in connection with one or more other processes described elsewhere herein.

In a first aspect, process 500 includes transmitting an MPE report having panel-specific parameters or beam-specific parameters.

In a second aspect, alone or in combination with the first aspect, the MPE parameters comprise one or more of a power-management-based maximum power reduction value, a power headroom value, a virtual power headroom value, or a modified power headroom value.

In a third aspect, alone or in combination with one or more of the first and second aspects, process 500 includes generating a panel-specific report based at least in part on beam-specific values.

In a fourth aspect, alone or in combination with one or more of the first through third aspects, generation of the panel-specific report based at least in part on the beam-specific values comprises generating the panel-specific report based at least in part on a minimum beam-specific value, a maximum beam-specific value, or an average of the beam-specific values.

In a fifth aspect, alone or in combination with one or more of the first through fourth aspects, the indication of support for one or more of panel-specific reporting or beam-specific reporting of MPE parameters comprises an indication of support for layer 1 reporting of one or more of panel-specific reporting or beam-specific reporting of MPE parameters.

In a sixth aspect, alone or in combination with one or more of the first through fifth aspects, the layer 1 reporting comprises one or more of a reference signal received power report, or a signal-to-interference-plus-noise report.

In a seventh aspect, alone or in combination with one or more of the first through sixth aspects, process 500 includes transmitting an indication of support for the UE to transmit a CSI report that includes CSI for an uplink channel.

In an eighth aspect, alone or in combination with one or more of the first through seventh aspects, the indication of support for the UE to transmit a CSI report that includes CSI for the uplink channel indicates support for the UE to transmit the CSI for the uplink channel via one or more of a same report that includes CSI for a downlink channel, or a separate report from a report that includes CSI for the downlink channel.

In a ninth aspect, alone or in combination with one or more of the first through eighth aspects, the support for the one or more of panel-specific reporting or beam-specific reporting is based at least in part on one or more of available computing resources of the UE, available communication resources of the UE, or MPE sensing components of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110) performs operations associated with techniques for MPE reporting.

As shown in FIG. 6, in some aspects, process 600 may include receiving an indication of support by a UE for one or more of panel-specific reporting or beam-specific reporting of MPE parameters (block 610). For example, the base station (e.g., using communication manager 150 and/or reception component 802, depicted in FIG. 8) may receive an indication of support by a UE for one or more of panel-specific reporting or beam-specific reporting of MPE parameters, as described above.

As further shown in FIG. 6, in some aspects, process 600 may include transmitting, to the UE, an indication to report the MPE parameters with panel-specific reporting or beam-specific reporting (block 620). For example, the base station (e.g., using communication manager 150 and/or transmission component 804, depicted in FIG. 8) may transmit, to the UE, an indication to report the MPE parameters with panel-specific reporting or beam-specific reporting, as described above.

Process 600 may include additional aspects, such as any single aspect or any combination of aspects described below and/or in connection with one or more other processes described elsewhere herein.

In a first aspect, process 600 includes receiving an MPE report having panel-specific parameters or beam-specific parameters.

In a second aspect, alone or in combination with the first aspect, the MPE parameters comprise one or more of a power-management-based maximum power reduction value, a power headroom value, a virtual power headroom value, or a modified power headroom value.

In a third aspect, alone or in combination with one or more of the first and second aspects, process 600 includes transmitting an indication of a configuration for generating a panel-specific report based at least in part on beam-specific values.

In a fourth aspect, alone or in combination with one or more of the first through third aspects, the configuration for generating the panel-specific report based at least in part on the beam-specific values comprises a configuration to generate the panel-specific report based at least in part on a minimum beam-specific value, a maximum beam-specific value, or an average of the beam-specific values.

In a fifth aspect, alone or in combination with one or more of the first through fourth aspects, the indication of support for one or more of panel-specific reporting or beam-specific reporting of MPE parameters comprises an indication of support for layer 1 reporting of one or more of panel-specific reporting or beam-specific reporting of MPE parameters.

In a sixth aspect, alone or in combination with one or more of the first through fifth aspects, the layer 1 reporting comprises one or more of a reference signal received power report, or a signal-to-interference-plus-noise report.

In a seventh aspect, alone or in combination with one or more of the first through sixth aspects, process 600 includes receiving an indication of support for the UE to transmit a CSI report that includes CSI for an uplink channel.

In an eighth aspect, alone or in combination with one or more of the first through seventh aspects, the indication of support for the UE to transmit the CSI report that includes CSI for the uplink channel indicates support for the UE to transmit the CSI for the uplink channel via one or more of a same report that includes CSI for a downlink channel, or a separate report from a report that includes CSI for the downlink channel.

In a ninth aspect, alone or in combination with one or more of the first through eighth aspects, the support for the one or more of panel-specific reporting or beam-specific reporting is based at least in part on one or more of available computing resources of the UE, available communication resources of the UE, or MPE sensing components of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
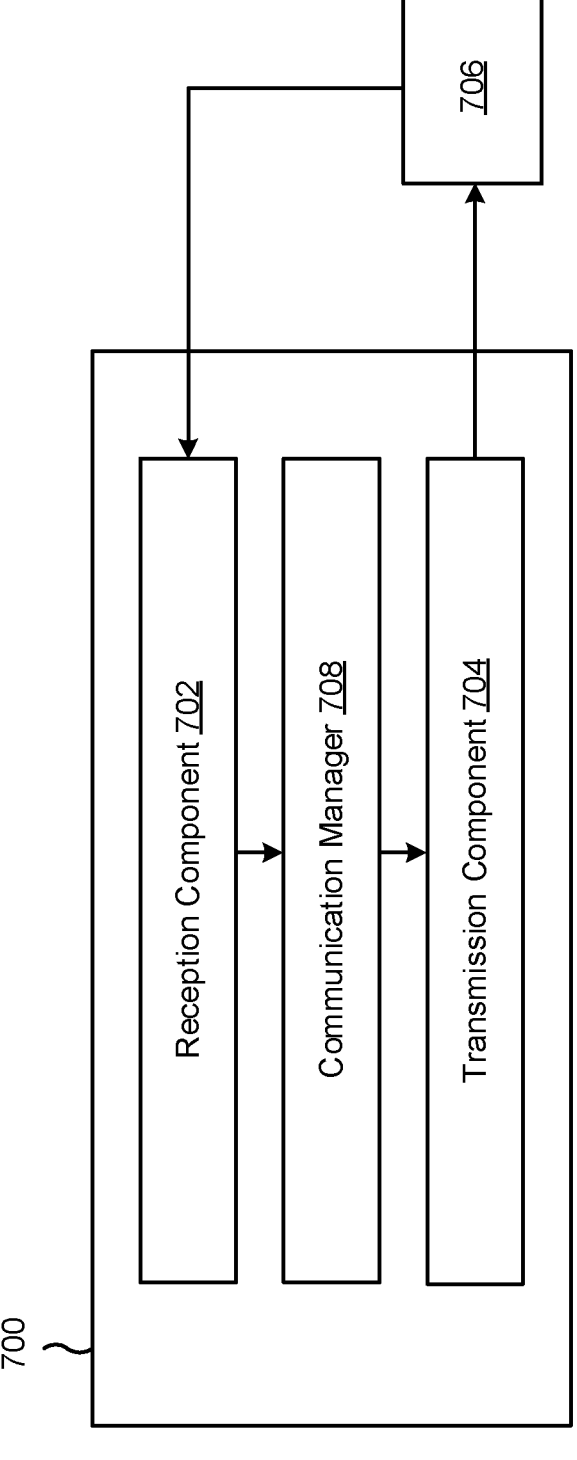
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., communication manager 140).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit an indication of support for one or more of panel-specific reporting or beam-specific reporting of MPE parameters. The reception component 702 may receive an indication to report the MPE parameters with panel-specific reporting or beam-specific reporting.

The transmission component 704 may transmit an MPE report having panel-specific parameters or beam-specific parameters.

The communication manager 708 may generate a panel-specific report based at least in part on beam-specific values.

The transmission component 704 may transmit an indication of support for the UE to transmit a CSI report that includes CSI for an uplink channel.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
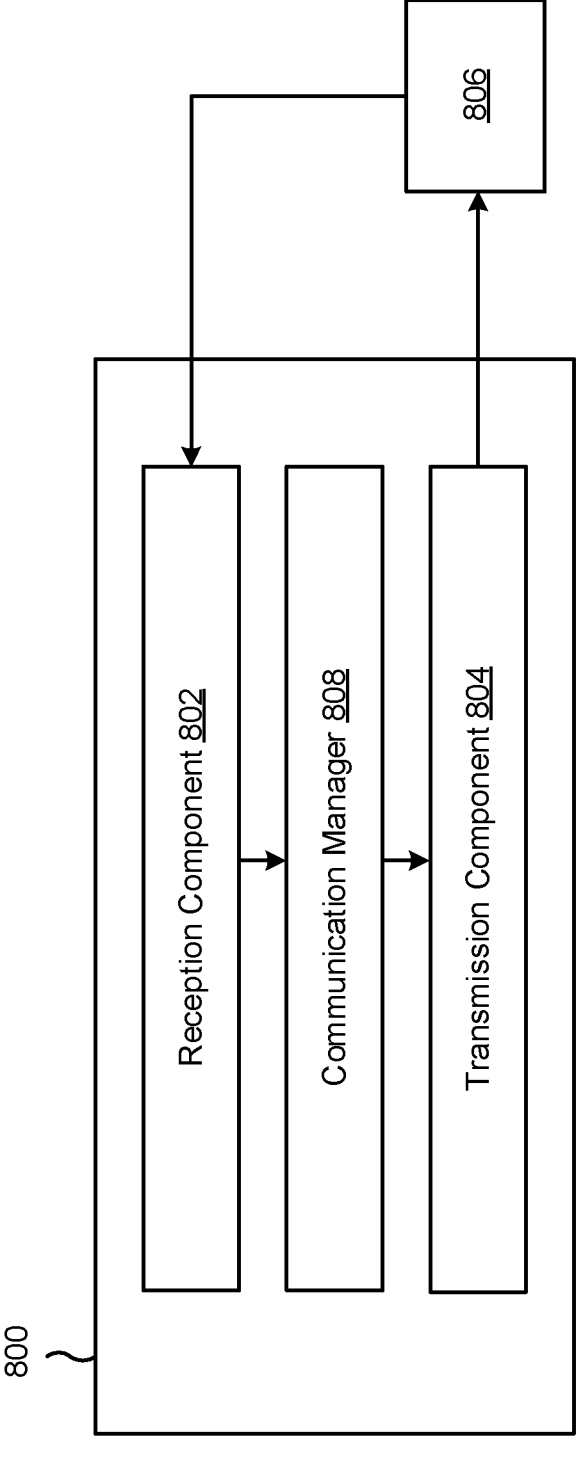

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., communication manager 150).

In some aspects, the apparatus 800 may be configured to perform one or more operations described herein in connection with FIG. 4. Additionally, or alternatively, the apparatus

800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The reception component 802 may receive an indication of support by a UE for one or more of panel-specific reporting or beam-specific reporting of MPE parameters. The transmission component 804 may transmit, to the UE, an indication to report the MPE parameters with panel-specific reporting or beam-specific reporting.

The reception component 802 may receive an MPE report having panel-specific parameters or beam-specific parameters.

The transmission component 804 may transmit an indication of a configuration for generating a panel-specific report based at least in part on beam-specific values.

The reception component 802 may receive an indication of support for the UE to transmit a CSI report that includes CSI for an uplink channel.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting an indication of support for one or more of panel-specific reporting or beam-specific reporting of maximum permissible exposure (MPE) parameters; and receiving an indication to report the MPE parameters with panel-specific reporting or beam-specific reporting.

Aspect 2: The method of Aspect 1, further comprising: transmitting an MPE report having panel-specific parameters or beam-specific parameters.

Aspect 3: The method of any of Aspects 1-2, wherein the MPE parameters comprise one or more of: a power-management-based maximum power reduction value, a power headroom value, a virtual power headroom value, or a modified power headroom value.

Aspect 4: The method of any of Aspects 1-3, further comprising: generating a panel-specific report based at least in part on beam-specific values.

Aspect 5: The method of Aspect 4, wherein generation of the panel-specific report based at least in part on the beam-specific values comprises: generating the panel-specific report based at least in part on a minimum beam-specific value, a maximum beam-specific value, or an average of the beam-specific values.

Aspect 6: The method of any of Aspects 1-5, wherein the indication of support for one or more of panel-specific reporting or beam-specific reporting of MPE parameters comprises an indication of support for layer 1 reporting of one or more of panel-specific reporting or beam-specific reporting of MPE parameters.

Aspect 7: The method of Aspect 6, wherein the layer 1 reporting comprises one or more of: a reference signal received power report, or a signal-to-interference-plus-noise report.

Aspect 8: The method of any of Aspects 1-7, further comprising: transmitting an indication of support for the UE to transmit a channel state information (CSI) report that includes CSI for an uplink channel.

Aspect 9: The method of Aspect 8, wherein the indication of support for the UE to transmit a CSI report that includes CSI for the uplink channel indicates support for the UE to transmit the CSI for the uplink channel via one or more of: a same report that includes CSI for a downlink channel, or a separate report from a report that includes CSI for the downlink channel Aspect 10: The method of any of Aspects 1-9, wherein the support for the one or more of panel-specific reporting or beam-specific reporting is based at least in part on one or more of: available computing resources of the UE, available communication resources of the UE, or MPE sensing components of the UE.

Aspect 11: A method of wireless communication performed by a base station, comprising: receiving an indication of support by a user equipment (UE) for one or more of panel-specific reporting or beam-specific reporting of maximum permissible exposure (MPE) parameters; and transmitting, to the UE, an indication to report the MPE parameters with panel-specific reporting or beam-specific reporting.

Aspect 12: The method of Aspect 11, further comprising: receiving an MPE report having panel-specific parameters or beam-specific parameters.

Aspect 13: The method of any of Aspects 11-12, wherein the MPE parameters comprise one or more of: a power-management-based maximum power reduction value, a power headroom value, a virtual power headroom value, or a modified power headroom value.

Aspect 14: The method of any of Aspects 11-12, further comprising: transmitting an indication of a configuration for generating a panel-specific report based at least in part on beam-specific values.

Aspect 15: The method of Aspect 14, wherein the configuration for generating the panel-specific report based at least in part on the beam-specific values comprises: a configuration to generate the panel-specific report based at least in part on a minimum beam-specific value, a maximum beam-specific value, or an average of the beam-specific values.

Aspect 16: The method of any of Aspects 11-15, wherein the indication of support for one or more of panel-specific reporting or beam-specific reporting of MPE parameters comprises an indication of support for layer 1 reporting of one or more of panel-specific reporting or beam-specific reporting of MPE parameters.

Aspect 17: The method of Aspect 16, wherein the layer 1 reporting comprises one or more of: a reference signal received power report, or a signal-to-interference-plus-noise report.

Aspect 18: The method of any of Aspects 11-17, further comprising: receiving an indication of support for the UE to transmit a channel state information (CSI) report that includes CSI for an uplink channel.

Aspect 19: The method of Aspect 18, wherein the indication of support for the UE to transmit the CSI report that includes CSI for the uplink channel indicates support for the UE to transmit the CSI for the uplink channel via one or more of: a same report that includes CSI for a downlink channel, or a separate report from a report that includes CSI for the downlink channel Aspect 20: The method of any of Aspects 11-19, wherein the support for the one or more of panel-specific reporting or beam-specific reporting is based at least in part on one or more of: available computing resources of the UE, available communication resources of the UE, or MPE sensing components of the UE.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

transmitting an indication of support for the UE to transmit a channel state information (CSI) report that includes CSI for an uplink channel;

transmitting an indication of support for one or more of panel-specific reporting or beam-specific reporting of maximum permissible exposure (MPE) parameters; and receiving an indication to report the MPE parameters with panel-specific reporting or beam-specific reporting.

2. The method of claim 1, further comprising:

transmitting an MPE report having panel-specific parameters or beam-specific parameters.

3. The method of claim 1, wherein the MPE parameters comprise one or more of:

a power-management-based maximum power reduction value, a power headroom value, a virtual power headroom value, or a modified power headroom value.

4. The method of claim 1, further comprising:

generating a panel-specific report based at least in part on beam-specific values.

5. The method of claim 4, wherein generation of the panel-specific report based at least in part on the beam-specific values comprises:

generating the panel-specific report based at least in part on a minimum beam-specific value, a maximum beam-specific value, or an average of the beam-specific values.

6. The method of claim 1, wherein the indication of support for one or more of panel-specific reporting or beam-specific reporting of MPE parameters comprises an indication of support for layer 1 reporting of one or more of panel-specific reporting or beam-specific reporting of MPE parameters.

7. The method of claim 6, wherein the layer 1 reporting comprises one or more of:

a reference signal received power report, or a signal-to-interference-plus-noise report.

8. The method of claim 1, wherein the indication of support for the UE to transmit a CSI report that includes CSI for the uplink channel indicates support for the UE to transmit the CSI for the uplink channel via one or more of:

a same report that includes CSI for a downlink channel, or a separate report from a report that includes CSI for the downlink channel.

9. The method of claim 1, wherein the support for the one or more of panel-specific reporting or beam-specific reporting is based at least in part on one or more of:

available computing resources of the UE, available communication resources of the UE, or MPE sensing components of the UE.

10. A method of wireless communication performed by a base station, comprising:

receiving an indication of support for a user equipment (UE) to transmit a channel state information (CSI) report that includes CSI for an uplink channel;

receiving an indication of support by the UE for one or more of panel-specific reporting or beam-specific reporting of maximum permissible exposure (MPE) parameters; and transmitting, to the UE, an indication to report the MPE parameters with panel-specific reporting or beam-specific reporting.

11. The method of claim 10, further comprising:

receiving an MPE report having panel-specific parameters or beam-specific parameters.

12. The method of claim 10, wherein the MPE parameters comprise one or more of:

a power-management-based maximum power reduction value, a power headroom value, a virtual power headroom value, or a modified power headroom value.

13. The method of claim 10, further comprising:

transmitting an indication of a configuration for generating a panel-specific report based at least in part on beam-specific values.

14. The method of claim 13, wherein the configuration for generating the panel-specific report based at least in part on the beam-specific values comprises:

a configuration to generate the panel-specific report based at least in part on a minimum beam-specific value, a maximum beam-specific value, or an average of the beam-specific values.

15. The method of claim 10, wherein the indication of support for one or more of panel-specific reporting or beam-specific reporting of MPE parameters comprises an indication of support for layer 1 reporting of one or more of panel-specific reporting or beam-specific reporting of MPE parameters.

16. The method of claim 15, wherein the layer 1 reporting comprises one or more of:

a reference signal received power report, or a signal-to-interference-plus-noise report.

17. The method of claim 10, wherein the indication of support for the UE to transmit the CSI report that includes CSI for the uplink channel indicates support for the UE to transmit the CSI for the uplink channel via one or more of:

a same report that includes CSI for a downlink channel, or a separate report from a report that includes CSI for the downlink channel.

18. The method of claim 10, wherein the support for the one or more of panel-specific reporting or beam-specific reporting is based at least in part on one or more of:

available computing resources of the UE, available communication resources of the UE, or MPE sensing components of the UE.

19. A user equipment (UE) for wireless communication, comprising:

one or more memories; and one or more processors, coupled to the one or more memories, configured, individually or collectively, to:

transmit an indication of support for the UE to transmit a channel state information (CSI) report that includes CSI for an uplink channel;

transmit an indication of support for one or more of panel-specific reporting or beam-specific reporting of maximum permissible exposure (MPE) parameters; and receive an indication to report the MPE parameters with panel-specific reporting or beam-specific reporting.

20. The UE of claim 19, wherein the one or more processors, individually or collectively, are further configured to:

transmit an MPE report having panel-specific parameters or beam-specific parameters.

21. The UE of claim 19, wherein the MPE parameters comprise one or more of:

a power-management-based maximum power reduction value, a power headroom value, a virtual power headroom value, or a modified power headroom value.

22. The UE of claim 19, wherein the one or more processors are further configured, individually or collectively, to:

generate a panel-specific report based at least in part on beam-specific values based at least in part on a minimum beam-specific value, a maximum beam-specific value, or an average of the beam-specific values.

23. The UE of claim 19, wherein the support for the one or more of panel-specific reporting or beam-specific reporting is based at least in part on one or more of:

available computing resources of the UE, available communication resources of the UE, or MPE sensing components of the UE.

24. A base station for wireless communication, comprising:

one or more memories; and one or more processors, coupled to the one or more memories, configured, individually or collectively, to:

receive an indication of support for a user equipment (UE) to transmit a channel state information (CSI) report that includes CSI for an uplink channel;

receive an indication of support by the UE for one or more of panel-specific reporting or beam-specific reporting of maximum permissible exposure (MPE) parameters; and transmit, to the UE, an indication to report the MPE parameters with panel-specific reporting or beam-specific reporting.

25. The base station of claim 24, wherein the one or more processors, individually or collectively, are further configured to:

receive an MPE report having panel-specific parameters or beam-specific parameters.

26. The base station of claim 24, wherein the MPE parameters comprise one or more of:

a power-management-based maximum power reduction value, a power headroom value, a virtual power headroom value, or a modified power headroom value.

27. The base station of claim 24, wherein the one or more processors, individually or collectively, are further configured to:

transmit an indication of a configuration for generating a panel-specific report based at least in part on beam-specific values.

28. The base station of claim 27, wherein the configuration for generating the panel-specific report based at least in part on the beam-specific values comprises:

a configuration to generate the panel-specific report based at least in part on a minimum beam-specific value, a maximum beam-specific value, or an average of the beam-specific values.

29. The base station of claim 24, wherein the indication of support for the UE to transmit the CSI report that includes CSI for the uplink channel is included in a same communication as the indication of support for the one or more of panel-specific reporting or beam-specific reporting of MPE parameters.

30. The UE of claim 19, wherein the indication of support for the UE to transmit the CSI report that includes CSI for the uplink channel is included in a same communication as the indication of support for the one or more of panel-specific reporting or beam-specific reporting of MPE parameters.

* * * * *